United States Patent
Dalebroux et al.

(10) Patent No.: US 6,636,722 B1
(45) Date of Patent: Oct. 21, 2003

(54) BROADBAND RECEIVER AMPLITUDE/PHASE NORMALIZATION USING A BROADBAND TEMPERATURE COMPENSATED NOISE SOURCE AND A PSEUDO RANDOM SEQUENCE GENERATOR

(75) Inventors: Donald J. Dalebroux, Vernonia, OR (US); Xiaofen Chen, West Linn, OR (US)

(73) Assignee: Tektronix, Inc., Beaverton, OR (US)

( * ) Notice: Subject to any disclaimer, the term of this patent is extended or adjusted under 35 U.S.C. 154(b) by 93 days.

(21) Appl. No.: 09/660,561

(22) Filed: Sep. 12, 2000

(51) Int. Cl.[7] ............................................... H04B 17/00
(52) U.S. Cl. ..................... 455/67.1; 455/67.4; 455/423; 455/425; 324/601; 324/603; 375/224; 375/229
(58) Field of Search ................................. 455/67.1, 67.4, 455/425, 423; 324/601, 603; 375/224, 229

(56) References Cited

U.S. PATENT DOCUMENTS

| | | | |
|---|---|---|---|
| 3,731,186 A | * | 5/1973 | Sadel ........................... 324/603 |
| 4,031,469 A | | 6/1977 | Johnson |
| 4,185,251 A | | 1/1980 | Brown, Jr. et al. |
| 4,235,107 A | * | 11/1980 | Ludeke et al. ............... 374/122 |
| 4,491,783 A | * | 1/1985 | Sawayama et al. ...... 242/477.1 |
| 4,685,065 A | | 8/1987 | Braun et al. |
| 4,740,996 A | | 4/1988 | Somer |
| 4,849,710 A | | 7/1989 | Vo |
| 5,162,678 A | | 11/1992 | Yamasaki |
| 5,166,559 A | | 11/1992 | Ishihara |
| 5,262,957 A | | 11/1993 | Hearn |
| 5,307,284 A | | 4/1994 | Brunfeldt et al. |
| 5,339,046 A | | 8/1994 | Kornfeld et al. |
| 5,352,944 A | | 10/1994 | Sacchi et al. |
| 5,408,697 A | | 4/1995 | Price et al. |
| 5,471,654 A | | 11/1995 | Okazaki et al. |
| 5,481,186 A | * | 1/1996 | Heutmaker et al. |
| 5,576,662 A | | 11/1996 | Price et al. |
| 5,649,320 A | | 7/1997 | Korhonen et al. |
| 5,796,291 A | | 8/1998 | Mattes et al. |
| 5,881,376 A | | 3/1999 | Lundberg et al. |
| 5,913,158 A | | 6/1999 | Sullivan |
| 5,949,845 A | | 9/1999 | Sterzer |
| 6,268,735 B1 | * | 7/2001 | Craig et al. .................. 514/279 |
| 6,297,709 B1 | * | 10/2001 | Wey et al. ................... 333/17.1 |

* cited by examiner

Primary Examiner—William Trost
Assistant Examiner—Danh Le
(74) Attorney, Agent, or Firm—Francis I. Gray

(57) ABSTRACT

A method of broadband receiver amplitude/phase normalization uses internal normalization sources—a thermally compensated noise source and a pseudo random sequence generator. A calibrated signal is applied to the input of the broadband receiver and processed by a digital signal processor to generate a gain versus frequency table. Then the internal noise source is applied to the input of the broadband receiver and process by a digital signal processor to generate a noise level versus frequency table. Finally the internal pseudo random sequence generator applies a pseudo random sequence waveform to the input of the broadband receiver, the pseudo random sequence waveform being process by the digital signal processor to generate equalization filter coefficients for the IF stages.

9 Claims, 2 Drawing Sheets

BROADBAND RECEIVER AMPLITUDE/PHASE NORMALIZATION USING A BROADBAND TEMPERATURE COMPENSATED NOISE SOURCE AND A PSEUDO RANDOM SEQUENCE GENERATOR

BACKGROUND OF THE INVENTION

The present invention relates to broadband receivers, and more particularly to broadband receiver amplitude/phase normalization using a broadband temperature compensated noise source and a pseudo random sequence generator.

A broadband receiver does not have constant gain across its input frequency range. However a receiver in test equipment such as a spectrum analyzer requires that the gain be constant in order to measure the amplitude of an input signal accurately. Typically to achieve this an amplitude calibration is performed where a known level input signal from a calibrated signal generator is stepped through the input bandwidth and the differences in gain with frequency are recorded and used by the instrument firmware to correct the amplitude response of the receiver.

The broadband receiver also has group delay and amplitude variations over single channel bandwidths mainly due to the narrowband filters required in intermediate frequency (IF) stages of the receiver. In a receiver where the final IF stage output is digitized and processed, the amplitude and frequency response of the IF stages may be equalized by injecting a known pseudo random sequence and correlating them in the digital signal processing.

One problem with these calibration steps is that the overall receiver gain and the IF filter response change with temperature subsequent to the calibration. This invalidates the calibration that was performed.

For a broadband receiver that may be used easily in the field for amplitude/phase normalization whenever necessary, what is desired is a self-contained calibration system which is temperature stable.

BRIEF SUMMARY OF THE INVENTION

Accordingly the present invention provides broadband receiver amplitude/phase normalization using a broadband temperature compensated noise source and a pseudo random sequence (PRS) generator. A broadband receiver has internal temperature compensated normalization sources—a noise source and a PRS generator. A receiver relay couples either a signal from an input port or the normalization sources to the receiver. A calibrated source provides a calibration signal at stepped frequency intervals to the receiver with the relay in a first position to generate a table of gain versus frequency. Then the internal noise source is switched in at the same stepped frequency intervals to produce a table of noise level versus frequency. Next the PRS generator is switched in at the lowest input frequency for the receiver to produce filter coefficients for an IF equalization filter. Since the normalization sources are temperature stable, they may be switched in and measured by the receiver at any time to normalize any subsequent changes in the broadband receiver gain or changes in the IF linear distortions due to changing temperature conditions.

The objects, advantages and other novel features of the present invention are apparent from the following detailed description when read in conjunction with the accompanying claims and attached drawing.

DETAILED DESCRIPTION OF THE INVENTION

Figure 1:
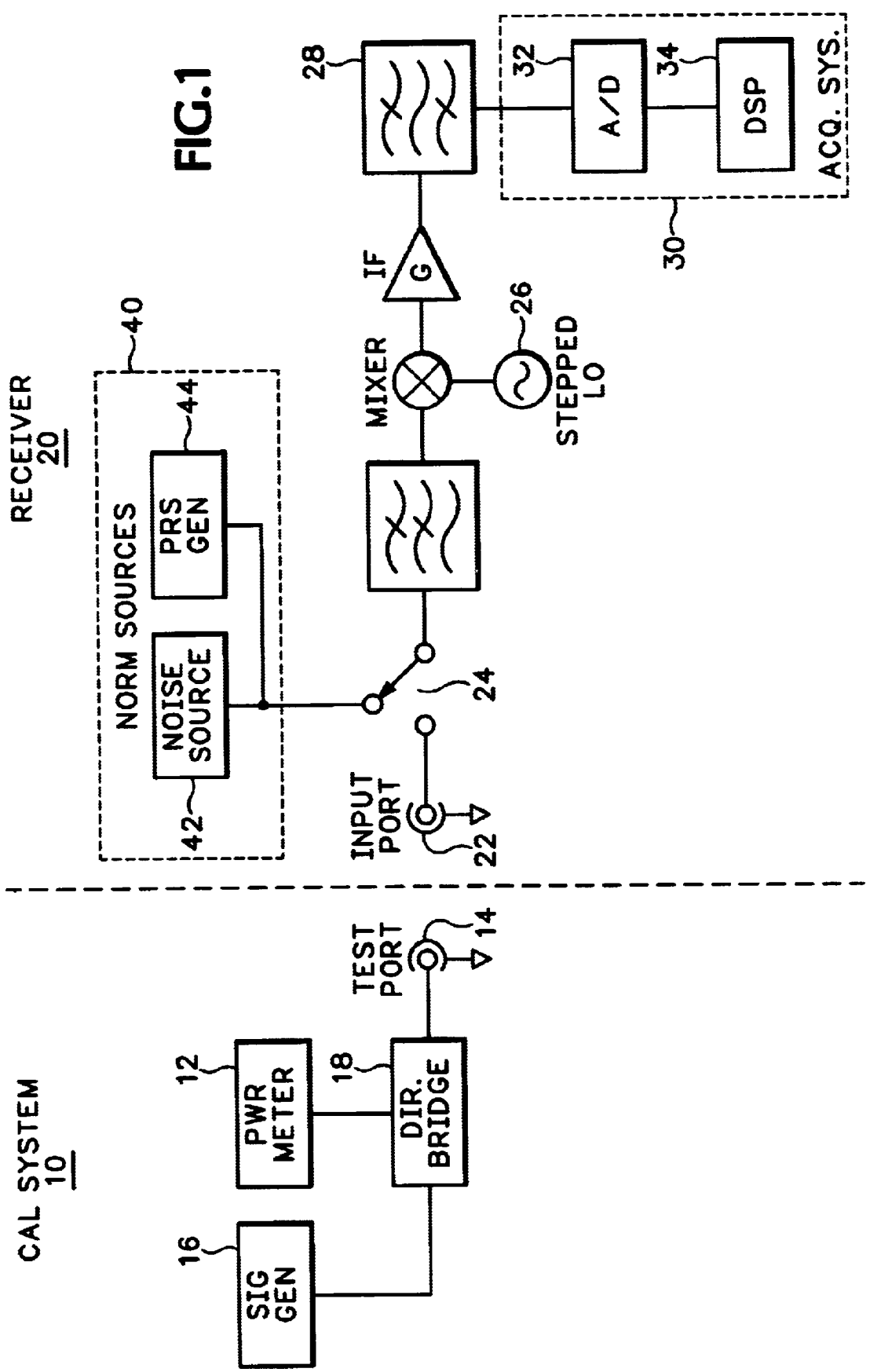
FIG. 1 is a block diagram view of a calibration/receiver system for initial calibration of the receiver according to the present invention.

Referring now to FIG. 1 the first step in the calibration procedure is to calibrate a calibration system 10 with a power meter at a test port 14 to determine the power from a signal generator 16 at the test port. The power also is measured with another power meter 12 at a coupled port of a directional bridge 18 so that the power at this port may be used to monitor the calibration system for changes in amplitude. This is possible because the coupled port is insensitive to the load impedance of the test port 14. Then a broadband receiver 20 to be calibrated is coupled to the test port 14 via an input port 22, with a relay 24 in a first position coupling the receiver to the input port. The relay 24 is preferably a mechanical relay for temperature stability, as an electronic RF switch suffers from the temperature drift of the switch. A calibrated signal from the calibration system 10 is applied to the input port 22 and stepped at some increment in frequency across the receiver's specified input bandwidth while stepping a receiver local oscillator (LO) 26 at the same increment so that the calibration signal is centered in the IF bandwidth of an IF filter 28. A table of gain versus frequency is obtained by an acquisition system 30 which includes an analog-to-digital converter (ADC) 32 and a digital signal processor (DSP) 34. Then the receiver relay 24 is switched from the input port 22 to normalization sources 40 and a noise source 42 is turned on. The noise level is then measured at the same frequency increment and a table of noise level versus frequency is obtained by the acquisition system 30. Since the noise level table is created at the same time and temperature as the calibration, it may now be used as a temperature stable reference source to determine any changes in the receiver gain subsequent to the calibration.

Figure 2:
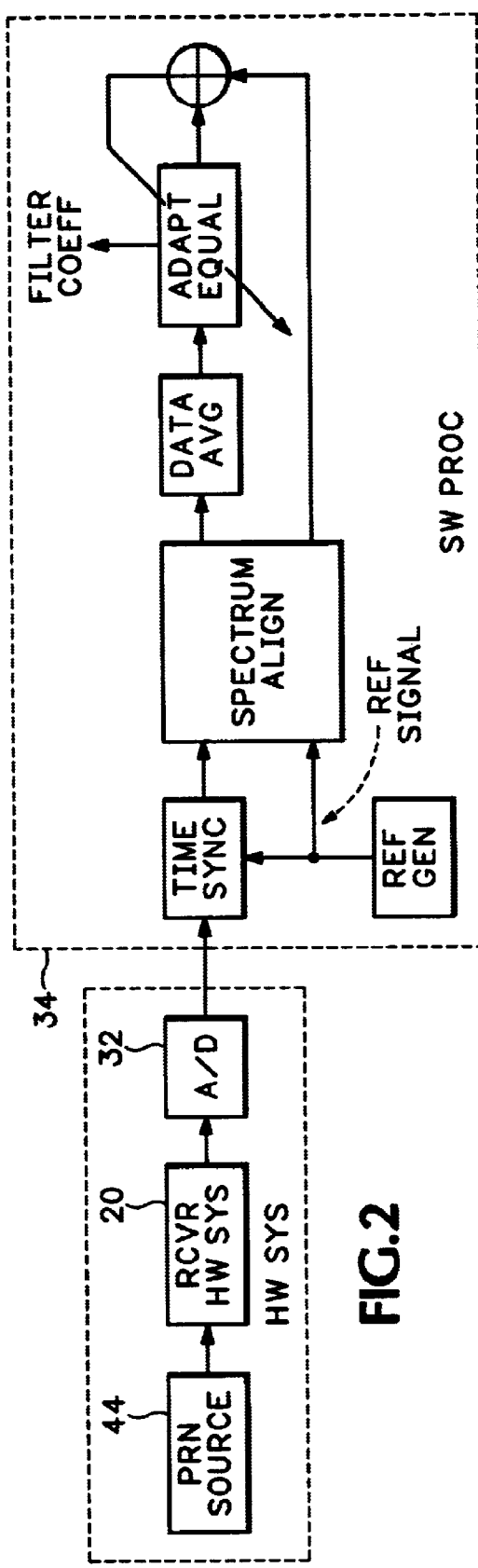
FIG. 2 is a block diagram view of IF band receiver amplitude/phase calibration processing according to the present invention.

Referring now to FIG. 2 the next step is to turn off the noise source and turn on a pseudo random sequence (PRS) generator 44 and tune the receiver 20 to the lowest input frequency. The PRS waveform is used to equalize IF group delay and amplitude variations based on a data-aided adaptive equalization technique. The PRS from the normalization sources 40 is acquired by the acquisition system 30 and processed by the DSP 34. The PRS is time synchronized with a reference signal by correlation. Then the spectral content of the reference signal is aligned with the PRS and the same spectral band of interest is extracted. Since the IF is the same for all receiver input frequencies, this only needs to be done at a single frequency. If the receiver's input frequency range is low enough and the PRS clock rate is high enough, the PRS at baseband has enough spectral content at the lowest frequency of the receiver to perform the equalization. The reason for tuning to the lowest frequency is done because the PRS produces a sinx/x spectrum with the first null at the clock frequency of the PRS. So in order to have sufficient spectral content to do the normalization, the receiver needs to be tuned below the first null. If broader spectral content is required of the PRS, the waveform may be pulse shaped to broaden the spectrum. In this case the square wave PRS may be shaped into narrow pulses. Another alternative is to up-convert the PRS.

Once these steps have been performed, the receiver firmware in the DSP 34 may use the tables to correct for broadband gain differences at each frequency increment with the IF centered. The equalization filter may be used to correct the IF bandwidth relative to the center. Since the normalization sources 40 are temperature stable, they may be switched in and measured by the receiver 20 at any time to normalize any subsequent changes in the broadband receiver gain or changes in the IF linear distortions due to changing temperature conditions.

Figure 3:
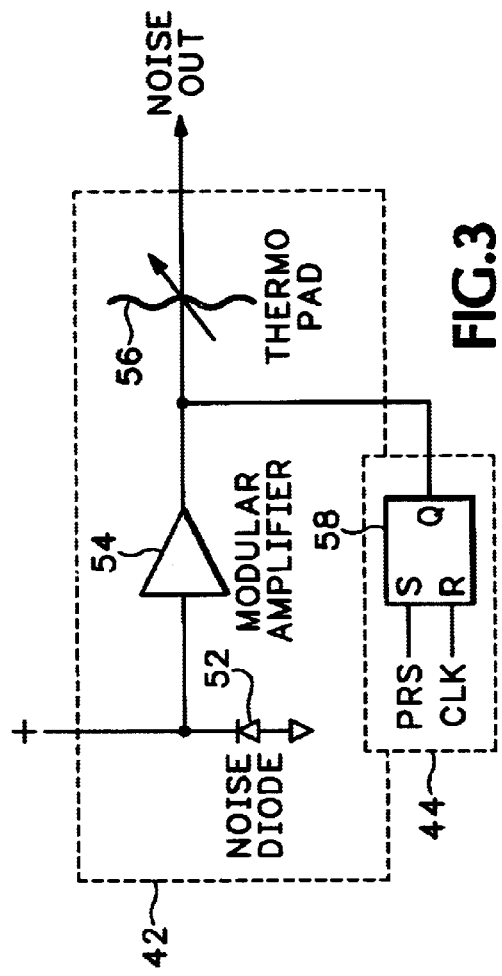
FIG. 3 is a block diagram view of normalization sources according to the present invention.

A more detailed diagram of the normalization sources 40 is shown in FIG. 3. The noise source 42 has a noise diode 52 coupled between a pair of voltage sources, such as +12 volts and ground. The output from the noise diode 52 is input to a modular amplifier 54. The noise diode 52 increases amplitude with increasing temperature, while the modular amplifier 54 decreases amplitude with increasing temperature to a lesser extent, leaving a slight overall increase. Therefore the output from the modular amplifier 54 is applied through a fixed thermal attenuator 56 to the receiver relay 24 to compensate for this residual increase. The thermal attenuator 56 increases attenuation with increasing temperature. The resulting overall amplitude change is very small, on the order of about 0.1 dB for a 10° C. to 60° C. temperature swing. The thermal coefficient of the attenuator 56 is determined empirically to compensate for the noise diode power and modular amplifier gain changes with temperature. This compensation may be performed by the DSP 34 instead of the thermal attenuator 56. The amplitude stability may also be achieved without the modular amplifier 54 by using an attenuator 56 with a higher temperature coefficient.

The PRS in the PRS generator 44 is generated by a programmable logic device (PLD) (not shown) and converted to ECL to produce a close to ideal PRS waveform. The PRS is clocked at a high frequency, such as 65 MHz, through an ECL output flip-flop 58 and fed via the thermal attenuator 56 to the receiver relay 24. If the receiver's lowest input frequency is 30 MHz, the PRS has significant spectral content over one IF channel bandwidth when the receiver is tuned to the lowest input frequency. This allows the PRS to be used at baseband rather than be up-converted. The advantage of this, apart from simplicity, is the inherent waveform stability of the ECL output over temperature. If it is necessary to up-convert the PRS, the mixing and filtering required may distort the waveform as well as change the waveform with change in temperature. If pulse shaping is used, it is difficult to temperature stabilize the width of the narrow pulses and even small changes may cause large changes in the spectrum.

Thus the present invention provides broadband receiver amplitude/phase normalization using internal thermally stable normalization sources including a noise source and a PRS generator, the receiver generating a gain versus frequency table from an external calibration source, a noise level versus frequency table from the internal noise source, and IF equalization filter coefficients from the PRS generator.

What is claimed is:

1. A test instrument having a broadband receiver with amplitude/phase normalization including an input port, intermediate (IF) frequency stages and a digital signal processor in series comprising:

normalization sources having an output;
a relay having a first input coupled to the input port, a second input coupled to the output of the normalization sources and an output coupled to the input of the intermediate frequency stages such that when the relay is in a first position the first input is coupled to the output and when the relay is in a second position the second input is coupled to the output; and
means in the digital signal processor for generating a table of gain versus frequency when a calibrated test signal is applied to the input port and the relay is in the first position and for generating compensation data from the normalization sources when the relay is in the second position.

2. The test instrument as recited in claim 1 wherein the normalization sources comprise:

a thermally compensated noise source having an output coupled to the output of the normalization sources such that when coupled to the IF stages by the relay the generating means produces as compensation data a noise level versus frequency table; and
a pseudo random sequence generator having a clock significantly greater in frequency than a lowest input frequency of the broadband receiver such that when coupled to the IF stages by the relay the generating means produces equalization filter coefficients for compensating IF data.

3. The test instrument as recited in claim 2 wherein the thermally compensated noise source comprises:

a noise diode coupled between a pair of potential rails having an output; and
a modular amplifier having an input coupled to the output of the noise diode and having an output coupled to the output of the normalization sources, the modular amplifier having a thermal characteristic opposite to that of the noise diode.

4. The test instrument as recited in claim 3 wherein the thermally compensated noise source further comprises a thermal attenuator coupled between the output of the modular amplifier and the output of the normalization sources to compensate for any difference in the thermal characteristics of the noise diode and modular amplifier.

5. The test instrument as recited in claim 2 wherein the thermally compensated noise source comprises:

a noise diode coupled between a pair of potential rails having an output; and
a thermal attentuator having an input coupled to the output of the noise diode and having an output coupled to the output of the normalization sources, the thermal attenuator having a thermal characteristic opposite to that of the noise diode.

6. The test instrument as recited in claim 2 wherein the generating means comprises:

means for time synchronizing the output from the pseudo random sequence generator with a reference signal;
means for aligning the spectral content of the reference signal with the spectral content of the output from the pseudo random sequence generator;
means for extracting a spectral band of interest; and
means for generating the equalization filter coefficients from the spectral band of interest.

7. A thermally compensated noise source comprising:

a noise diode coupled between a pair of potential rails and having an output; and
a modular amplifier having an input coupled to the output of the noise diode and having an output, the modular amplifier having a thermal characteristic opposite to that of the noise diode; and a thermal attenuator having an input coupled to the output of the modular amplifier and having an output, the thermal attenuator having a thermal characteristic to compensate for any difference in the thermal characteristics of the noise diode and modular amplifier.

8. A thermally compensated noise source for providing a noise signal comprising:

a noise diode coupled between a pair of potential rails having an output; and a thermal attenuator having an input coupled to the output of the noise diode and having an output for the noise signal, the thermal attenuator having a thermal characteristic opposite to that of the noise diode.

9. A method of broadband receiver amplitude/phase normalization for a broadband receiver having an input port, intermediate frequency (IF) stages and a processor in series comprising the steps of:

applying a calibrated signal to the input port;

generating in the processor for the calibrated signal a gain versus frequency table;

applying a thermally compensated noise signal to the IF stages;

generating in the processor for the thermally compensated noise signal a noise level versus frequency table;

applying a pseudo random sequence to the IF stages at baseband; and generating in the processor for the pseudo random sequence equalization filter coefficients.

* * * * *